UNITED STATES PATENT OFFICE.

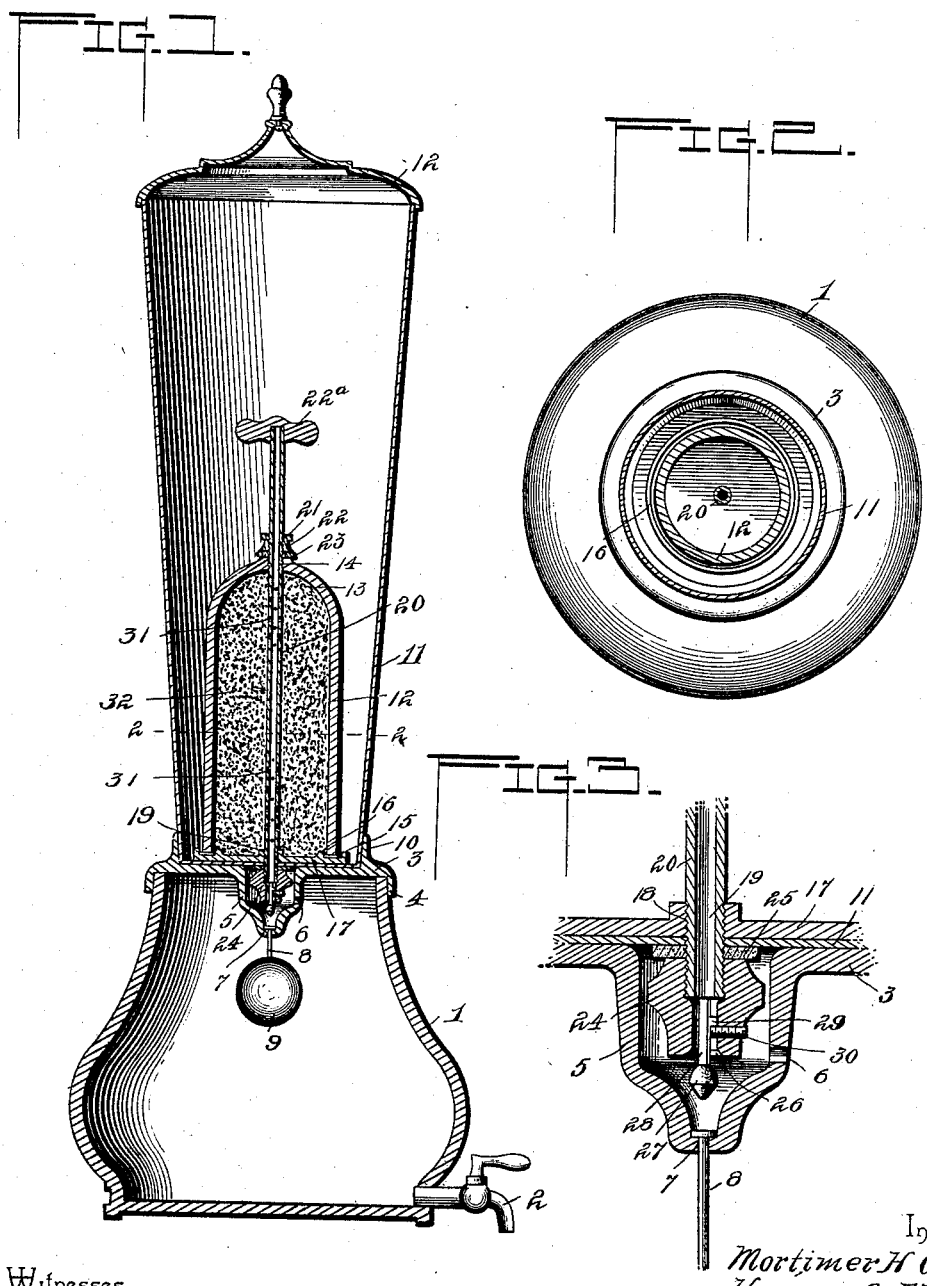

MORTIMER H. ALLEN AND HENRY C. ELLIS, OF TOLEDO, OHIO.

GRAVITY-FILTER.

SPECIFICATION forming part of Letters Patent No. 590,293, dated September 21, 1897.

Application filed November 30, 1896. Serial No. 613,978. (No model.)

*To all whom it may concern:*

Be it known that we, MORTIMER H. ALLEN and HENRY C. ELLIS, citizens of the United States, residing at Toledo, in the county of Lucas and State of Ohio, have invented a new and useful Gravity-Filter, of which the following is a specification.

This invention relates to water-filters; and it has for its object to provide a new and useful filter of the gravity type wherein the filtration of the water is secured by the gravitation thereof from an upper to a lower chamber.

To this end the main and primary object of the invention is to provide a gravity water-filter especially adapted for use in residences where hydrant-water is not used or where well or cistern water is preferred, while at the same time being so constructed as to secure a mechanical and chemical filtration of the water, whereby a thorough and effective separation of disease germs and other impurities is insured.

The invention also contemplates a novel construction of filter, all of the parts of which are readily accessible for cleaning, so that accumulated impure matter can be easily removed.

With these and other objects in view the invention consists in the novel construction, combination, and arrangement of parts hereinafter more fully described, illustrated, and claimed.

In the accompanying drawings, Figure 1 is a vertical longitudinal sectional view of a gravity-filter constructed in accordance with this invention. Fig. 2 is a cross-sectional view on the line 2 2 of Fig. 1. Fig. 3 is an enlarged detail sectional view of the automatic cut-off valve device for the filtered-water chamber or jar.

Referring to the accompanying drawings, the numeral 1 designates a jar or chamber of any size and configuration, and such jar or chamber is preferably made of stoneware tastefully ornamented, so as present an attractive appearance. The jar 1 forms the filtered-water reservoir of the filter and is provided at one side near its base with a draw-off faucet or cock 2, through which the filtered water is drawn from the jar as required. The filtered-water jar 1 may be of any desired capacity and the open upper end thereof is inclosed by a metallic cap-plate 3, forming a cover for the filtered-water jar and provided at its edge with a peripheral depending flange 4, embracing the top edges of the jar 1, so as to tightly cover such jar and exclude foreign matter therefrom.

The metallic cap-plate 3 rests on top of the jar 1 without being fastened thereto, so that the said plate may be readily removed at any time for the purpose of giving access to the jar when cleaning or washing the same, and the said metallic cap-plate 3 has formed integrally therewith a central depending water trap or pocket 5, projecting within the top portion of the jar 1 and formed in one side with a discharge-port 6, providing communication between the interior of the trap or pocket and the interior of the jar, whereby filtered water may readily flow from the said trap or pocket into the jar. The trap or pocket 5 of the jar-cap 3 is further provided in its lower end with a guide-opening 7, which accommodates for movement therein a vertically-movable float-stem 8, carrying at its lower end within the jar 1 a spherical or other shaped float 9, the function of which will be hereinafter more particularly referred to.

The metallic jar cap or cap-plate 3 is provided on its upper side with an upwardly-projecting annular seat-flange 10, forming a seat to receive the lower closed end portion of an upright metallic reservoir-tank 11. The upright metallic reservoir-tank 11 is preferably made of galvanized iron and is of an upwardly-flaring shape, whereby the same will have a reasonably large capacity for holding unfiltered water. The upright reservoir-tank 11 is of course made of any suitable size proportionate to the size of the filtered-water jar 1 and is inclosed at its open upper end by a detachable lid or cover 12, which when removed permits of the ready filling or emptying of the said tank 11. The closed lower end of the tank 11 rests snugly within the flange 10 flat on top of the jar cap-plate 3, and arranged for support within the lower part of the tank 11, on the bottom thereof, is an inverted cylindrical porous filtering-tube 12.

The inverted cylindrical porous filtering-tube 12, preferably made of unglazed porcelain, is designed to remove from the water all suspended matter and germs of disease, said tube being made very fine-grained and burned at a very high degree of heat, so that the pores thereof will not become clogged with sediment while the tube is in use. The inverted filtering-tube 12 is provided with a rounded closed dome portion 13 at its upper end, having formed centrally therein a threaded opening 14, and the lower edge of the said tube bears on a gasket-ring 15, seated in an annular seat-groove 16, formed on the upper side and at the peripheral edge of a bottom closure-plate 17, which forms a closure for the lower open end of the filtering-tube. The bottom closure-plate 17 of the inverted filtering-tube rests flat on the upper side of the bottom plate of the tank 11 and is provided with a central threaded opening 18, receiving therein the threaded lower end 19 of a vertical circulating-pipe 20, extending centrally and longitudinally through the filtering-tube 12 and provided at a point below its upper end with a threaded portion or section 21, engaging in the threaded opening 14, formed in the top of the tube 12. The vertical circulating-pipe 20 extends above the top of the tube 12 and has fitted in its upper end a handle or grip 22ª to facilitate the separation of the pipe from the other parts of the filter when it is necessary to clean the same. A jam or lock nut 22 is fitted on the threaded portion of the pipe 20 and binds on top of a packing-washer 23 to provide a water-tight joint between the circulating-pipe and the top of the filtering-tube and also serves to securely lock the parts together at this point, and the lower threaded end 19 of the vertical circulating-pipe 20 extends through the bottom of the upper reservoir-tank 11 and detachably receives thereon an interiorly-threaded tubular valve-nut 24.

The valve-nut 24 screws against a rubber washer 25, interposed between the same and the bottom of the tank 11, so as to form a perfectly water-tight joint at this point, and it will also be observed that when the valve-nut is screwed in position the same serves to detachably fasten the filtering-tube and circulating-pipe in their proper upright positions within the lower part of the unfiltered-water tank 11. The said tubular valve-nut 24 is formed at its lower end with a beveled or conical valve-seat 26, below which is arranged the conical valve-plug 27 at the lower end of a short valve-stem 28, working within the nut 24 and provided intermediate of its ends with a lateral projection 29, disposed above the inner projecting end of a screw-pin 30, detachably threaded in one side of the nut 24 to provide for preventing the stem 28 from dropping out of the nut while the filter is in use. The valve-stem 28 is therefore supported for vertical movement within the tubular valve-nut 24 and holds the valve 27 disposed in vertical alinement with the vertically-movable stem 8 of the float 9, so that when such float 9 rises with the water in the jar 1 the stem 8 will move against the valve-plug 27 and cause the same to be carried into the valve-seat 26, thereby automatically cutting off the flow of filtered water from the circulating-pipe 20 into the water trap or pocket 5. The vertical water-circulating pipe 20 is preferably provided at points within the upper and lower portions of the inverted filtering-tube 12 with a plurality of openings or perforations 31, which admit the water from the interior of the tube into the pipe 20, and the entire interior of the said tube 12 surrounding the pipe 20 is preferably designed to be filled with a carbon packing 32, which removes the coloring-matter in solution and deodorizes the water, it being understood that the water first passes through the tube and then through the carbon filling or packing, so that no suspended matter in the water can enter the carbon filling or packing to render the latter impure.

In the operation of the filter the tank 11 is filled with unfiltered water, which water follows the course referred to and in its filtered condition escapes from the pipe 20 into the water trap or pocket 5 and thence through the lateral discharge-port 6 into the jar 1. When the water in the jar 1 rises to the float 9, it carries such float upward and causes the valve 27 to automatically cut off a further flow of filtered water from the pipe 20 in the manner described, thereby positively preventing an overflow of filtered water out of the top of the lower filtered-water jar 1. When the level of the water lowers in the jar 1, the float 9 drops and permits the valve-plug 27 to also drop away from its seat and again open up communication between the interior of the filtering-tube and the filtered-water jar 1.

To clean the filter, it is simply necessary to lift the tank 11 from the cap-plate or cover 3 of the jar 1, and after emptying any water remaining in the tank 11 the nut 24 may be readily unscrewed, so that all of the parts may be separated and access gained to every portion thereof.

Changes in the form, proportion, and the minor details of construction may be resorted to without departing from the spirit or sacrificing any of the advantages of this invention.

Having thus described our invention, what we claim, and desire to secure by Letters Patent, is—

1. In a gravity water-filter, a lower filtered-water receptacle, an upper reservoir-tank seated on top of said lower receptacle, a filtering-tube, having an upper closed end, supported within the reservoir-tank on the bottom thereof, a circulating-pipe arranged within the filtering-tube and having its lower end projected through the bottom of the tank, a valve-casing fitted to the lower projecting end of said pipe and communicating with the interior of the lower receptacle, and an automatically-controlled cut-off valve supported by the valve-casing, substantially as set forth.

2. In a gravity water-filter, a lower filtered-water receptacle having at the top thereof a pendent water trap or pocket having a discharge-port, an upper reservoir-tank seated on top of said receptacle, an inverted porous filtering-tube supported within the reservoir-tank on the bottom thereof, a circulating-pipe arranged within the filtering-tube and having its lower end projected through the bottom of the tank, and an automatically-operating cut-off valve device fitted on the lower projecting end of the circulating-pipe within said water trap or pocket, substantially as set forth.

3. In a gravity water-filter, a lower filtered-water receptacle, an upper reservoir-tank seated on top of said lower receptacle, an inverted porous filtering-tube supported within the reservoir-tank on the bottom thereof, a circulating-pipe arranged within the filtering-tube and having its lower end projected through the bottom of the tank, and an automatically-operating cut-off valve device fitted on the lower projecting end of the circulating-pipe, substantially as set forth.

4. In a gravity-filter, a lower filtered-water jar, a flanged cap-plate removably fitted on top of said jar and provided with a central depending water trap or pocket having a lateral discharge-port, an upper reservoir-tank removably seated at its lower closed end on top of the cap-plate, a bottom closure-plate fitted within the reservoir-tank on the bottom thereof and provided at its periphery with an annular seat-groove and with a central threaded opening, an inverted porous filtering-cup arranged within the tank with its lower edge fitting in the seat-groove of the said bottom closure-plate and provided with a central threaded opening in the closed top thereof, a vertical water-circulating pipe extending longitudinally through the filtering-tube and having threaded portions engaging in the threaded opening at the top of the filtering-tube and at the center of the bottom closure-plate, said pipe being provided at points within the tube with a plurality of openings and having its lower end extended below the bottom of the tank, a tubular valve-nut detachably threaded on the lower extremity of the circulating-pipe and arranged within said water trap or pocket, said nut being formed at its lower end with a valve-seat, a valve-stem supported for vertical movement in the valve-nut and carrying at its lower end a valve-plug working on the said seat, and a float-operated stem mounted to work within the lower end of the water trap or pocket in line with said valve-plug, substantially as specified.

In testimony that we claim the foregoing as our own we have hereto affixed our signatures in the presence of two witnesses.

MORTIMER H. ALLEN.
HENRY C. ELLIS.

Witnesses:
F. D. POPE,
CHAS. F. CHAPMAN, Jr.